United States Patent [19]
Leonhardt et al.

[11] Patent Number: 6,092,959
[45] Date of Patent: Jul. 25, 2000

[54] METHOD FOR DECELERATING A VEHICLE, HIGHWAY CRASH CUSHION, AND ENERGY ABSORBING ELEMENT THEREFOR

[75] Inventors: Patrick A. Leonhardt, Yuba City; Lincoln C. Cobb, Auburn; John V. Machado, Antelope, all of Calif.

[73] Assignee: Energy Absorption Systems, Inc., Chicago, Ill.

[21] Appl. No.: 09/193,046

[22] Filed: Nov. 16, 1998

[51] Int. Cl.$^7$ ................................................. E01F 15/00
[52] U.S. Cl. ............................................. 404/6; 256/13.1
[58] Field of Search .......................... 404/6; 256/13.1; 188/377; 293/132, 133

[56] References Cited

U.S. PATENT DOCUMENTS

| | | | |
|---|---|---|---|
| 3,506,295 | 4/1970 | Yancey | 293/133 |
| 3,674,115 | 7/1972 | Young et al. | 404/6 |
| 3,757,562 | 9/1973 | Goldberg et al. | 73/12 |
| 3,930,665 | 1/1976 | Ikawa | 280/150 |
| 3,944,187 | 3/1976 | Walker | 188/377 |
| 3,972,390 | 8/1976 | Melton et al. | 188/1 C |
| 4,190,275 | 2/1980 | Mileti | 293/102 |
| 4,204,659 | 5/1980 | Phillips et al. | 248/562 |
| 4,221,413 | 9/1980 | Bonnetain | 188/377 |
| 4,227,593 | 10/1980 | Bricmont et al. | 188/377 |
| 4,352,484 | 10/1982 | Gertz et al. | 188/377 |
| 4,407,484 | 10/1983 | Meinzer | 404/6 |
| 4,413,856 | 11/1983 | McMahan et al. | 296/188 |
| 4,452,431 | 6/1984 | Stephens et al. | 404/6 |
| 4,635,981 | 1/1987 | Friton | 256/13.1 |
| 4,655,434 | 4/1987 | Bronstad | 256/13.1 |
| 4,674,911 | 6/1987 | Gertz | 404/6 |
| 4,711,481 | 12/1987 | Krage et al. | 256/13.1 |
| 5,199,755 | 4/1993 | Gertz | 293/120 |
| 5,248,129 | 9/1993 | Gertz | 256/13.1 |
| 5,577,861 | 11/1996 | Oberth et al. | 404/6 |
| 5,642,792 | 7/1997 | June | 188/377 |
| 5,797,592 | 8/1998 | Machado | 404/6 |
| 5,851,005 | 12/1998 | Muller et al. | 404/6 |
| 5,868,521 | 2/1999 | Oberth et al. | 404/6 |
| 5,947,452 | 9/1999 | Albritton | 404/6 |

Primary Examiner—Thomas B. Will
Assistant Examiner—Kristine M. Markovich
Attorney, Agent, or Firm—Brinks Hofer Gilson & Lione

[57] ABSTRACT

A highway crash cushion provides a system response profile that reduces the stopping distance of an impact event. This crash cushion includes a frame that forms at least two bays arranged one behind another in an anticipated impact direction. The frame includes at least three transverse frames and side frames extending between adjacent transverse frames. Each of the side frames includes first and second side frame elements coupled to the respective transverse frames, and a hinge coupled between the first and second side frame elements. At least one energy absorbing element is disposed in one of the bays, and at least first and second restraints are coupled to the side frames to resist movement of the hinges at an early stage in an impact event. The crash cushion is partially collapsed automatically as the crash cushion is raised from a horizontal to a vertical position, and then extended automatically to its operational position as the crash cushion is lowered from the vertical to the horizontal position. The energy absorbing elements can include tapered frusto-conical sheet metal elements that are stacked with the smaller ends facing first and second opposed sides of the energy absorbing element.

43 Claims, 10 Drawing Sheets

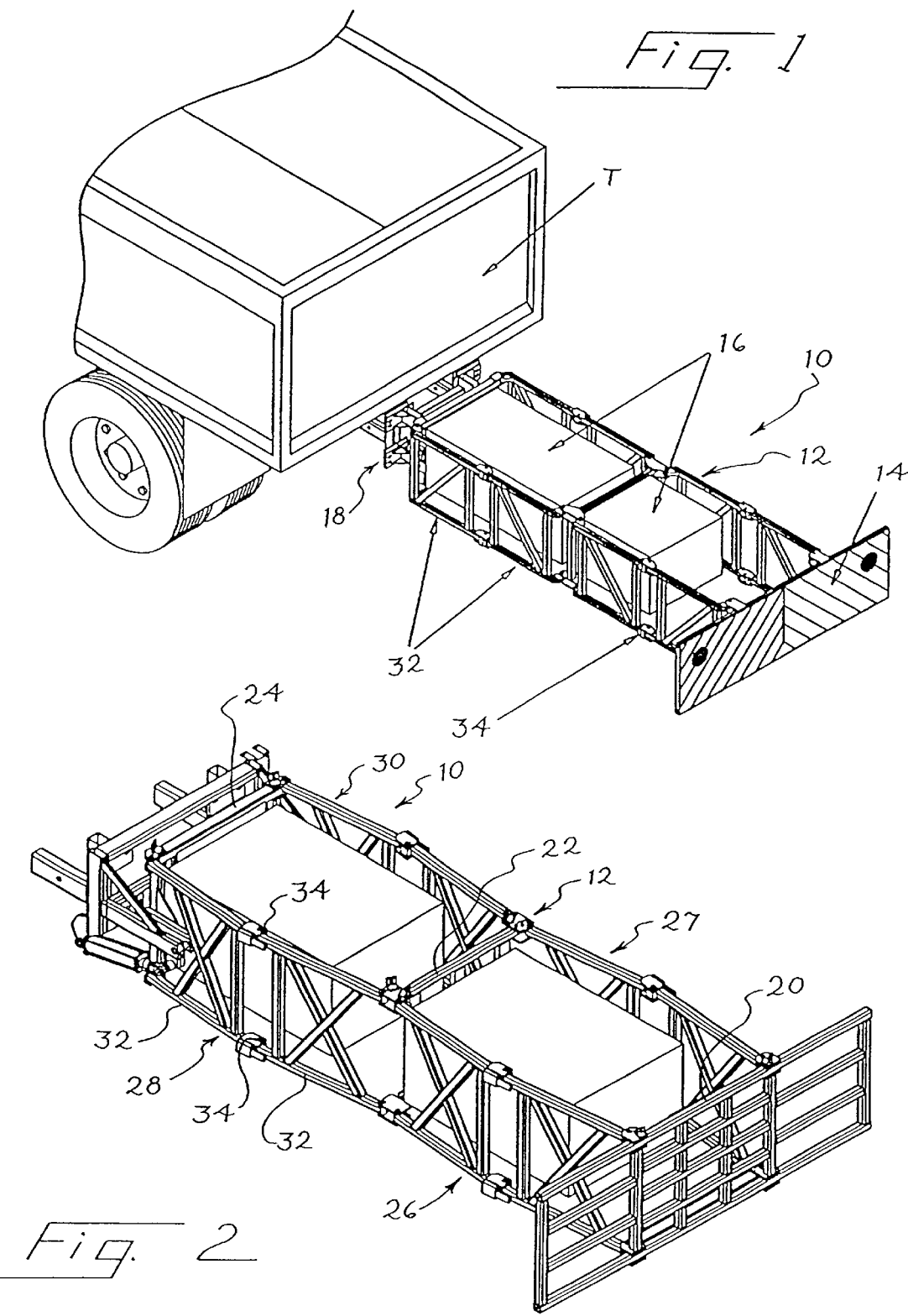

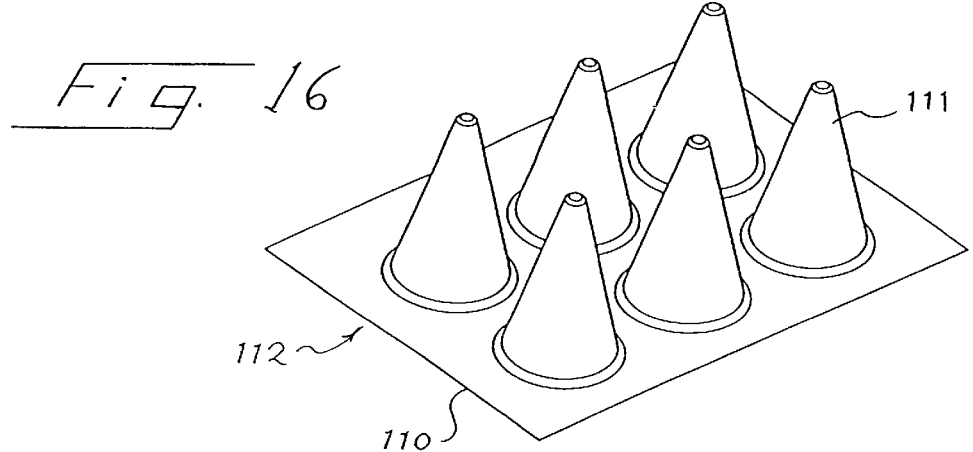
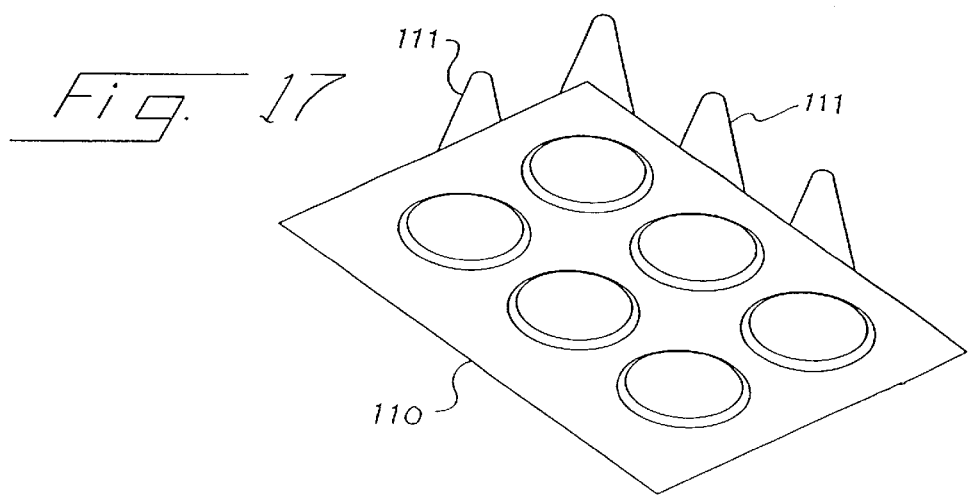
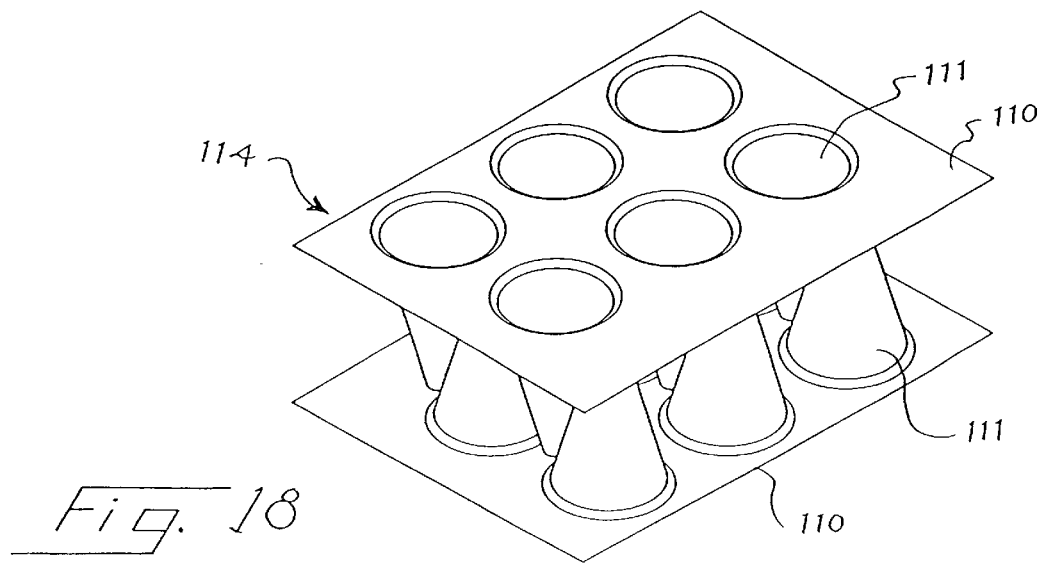

METHOD FOR DECELERATING A VEHICLE, HIGHWAY CRASH CUSHION, AND ENERGY ABSORBING ELEMENT THEREFOR

BACKGROUND

The present invention relates to an improved highway crash cushion that operates to decelerate an impacting vehicle safely and efficiently.

Highway crash cushions are widely used to decelerate impacting vehicles while limiting deceleration to safe levels for occupants of the vehicles. Such cushions are used alongside roadways in many applications, such as in front of bridge piers and other obstructions. Additionally, highway crash cushions are positioned on shadow vehicles such as heavy trucks that are parked in front of work zones. The truck protects the work zone against intrusion from a vehicle that has left the roadway, and the highway crash cushion protects the impacting vehicle and the shadow truck during the collision.

June U.S. Pat. No. 5,642,792 assigned to the assignee of the present invention, discloses one highway crash cushion that is mounted to a truck via a support frame that includes articulated arms. An energy absorbing element is disposed in the support frame, which is designed to collapse and to decelerate an impacting vehicle in a controlled manner.

SUMMARY

The present invention is directed to an improved highway crash cushion and associated method that provide important advantages in terms of improved design flexibility. This allows the crash cushion designer to tailor the decelerating loads imposed by the crash cushion on the impacting vehicle to optimize efficiency. This invention is defined by the following claims, and nothing in this section should be taken as a limitation on those claims.

By way of introduction, the crash cushion described below includes a frame that forms at least first and second bays arranged one behind the other in an anticipated impact direction. The frame includes at least first, second and third transverse frames spaced from one another along the anticipated impact direction such that the first bay is between the first and second transverse frames and the second bay is between the second and third transverse frames. At least four side frames are included in the frame, with the first and second side frames extending between the first and second transverse frames on respective sides of the first bay, and the third and fourth side frames extending between the second and third transverse frames on respective sides of the second bay. Each of the side frames includes first and second side frame elements that are coupled to the respective transverse frames, and a hinge coupled between the first and second side frame elements. At least one energy absorbing element is disposed in at least one of the bays, and at least two restraints are coupled to the side frames to resist movement of the hinges.

The energy absorbing elements can take many forms. In one preferred form the energy absorbing element includes tapered deformable sheet metal elements. Each sheet metal element defines a longitudinal axis extending between a smaller and a larger end, and the longitudinal axes are generally aligned with some of the smaller ends facing a first side of the energy absorbing element and others of the smaller ends facing a second side of the energy absorbing element, opposite the first side.

The crash cushion described in detail below is one example of a new type of crash cushion having a system response profile that provides an unusually efficient operation and stops an impacting vehicle in an unusually short distance while complying with controlling regulations. The system response profile of the disclosed crash cushion is characterized by an initial portion, an intermediate portion and a final portion. The decelerating force of the response profile during the final portion has an average value F; the decelerating force during the initial portion peaks at a value substantially greater than F; and the decelerating force during the intermediate portion falls to a value substantially less than F. This system response profile initially slows the vehicle markedly, then substantially reduces or eliminates decelerating forces on the vehicle, and finally provides a controlled decelerating force to stop the vehicle. In this way, the time and distance required initially to slow the impacting vehicle by a specified amount (such as 12 meters per second) is minimized, and the impacting vehicle quickly reaches the third portion of the profile, where the impacting vehicle is decelerated at a high average rate, up to about 20 G in many applications.

The drawings and detailed description disclose the preferred embodiments in greater detail, along with many of their advantages.

BRIEF DESCRIPTION OF THE DRAWINGS

FIG. 1 is a perspective view of a first preferred embodiment of the highway crash cushion of this invention.

FIG. 2 is a more detailed perspective view of the crash cushion of FIG. 1.

FIGS. 16 and 17 are upper and lower perspective views of a one-directional array of tapered deformable elements.

FIG. 18 is a perspective view of a bi-directional array of tapered deformable elements.

DETAILED DESCRIPTION OF THE PRESENTLY PREFERRED EMBODIMENTS

Figure 3:
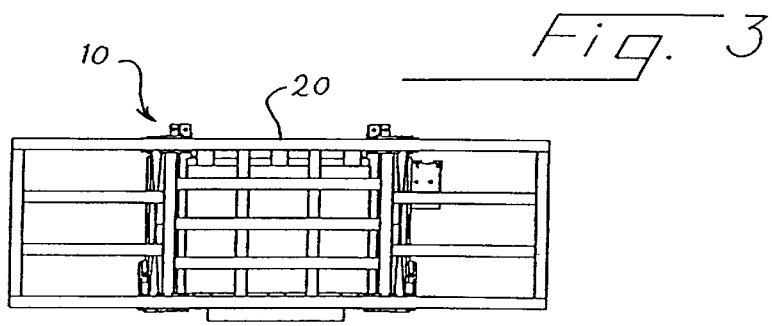
FIGS. 3, 4 and 5 are front, top and side views, respectively, of the crash cushion of FIG. 2.

Turning now to the drawings, FIG. 1 shows a crash cushion 10 that incorporates a presently preferred embodiment of this invention. The crash cushion 10 is mounted at the rear of a shadow vehicle or truck T by means of a mounting structure 18. The crash cushion 10 includes a frame 12 described in greater detail below. The frame 12 supports an impact face 14 directed away from the truck T, and the frame 12 defines two bays that support respective energy absorbing elements 16. The frame 12 forms a self-supporting structure, and the energy absorbing elements 16 are designed to absorb energy in an impact but not to serve a structural function in the crash cushion 10.

FIG. 2 shows a more detailed perspective view of the crash cushion 10, including transverse frames 20, 22 and 24 and side frames 26, 27, 28, 30. The impact face 14 of FIG. 1 is not shown in FIG. 2 for clarity of illustration, but the face 14 is mounted on the transverse frame 20. In some embodiments, the face 14 can be non-structural or even eliminated.

Figure 4:
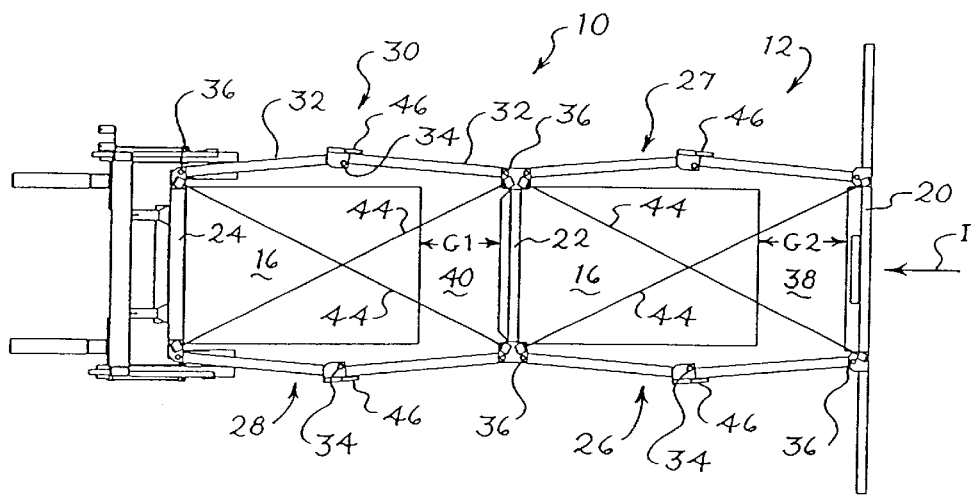

As best shown in FIG. 4, each of the side frames 26, 27, 28, 30 includes two separate side frame elements 32 that are interconnected by a pair of central hinges 34. Additionally, each of the side frame elements 32 is connected by additional hinges 36 to a respective one of the transverse frames 20, 22, 24. As shown in FIG. 4, the side frame elements 32 are bowed outwardly, and the hinges 34 are positioned to allow the side frame elements 32 to move outwardly in an impact.

The transverse frames 20, 22 and the side frames 26, 27 form a first bay 38 that contains the first element 16. Similarly, the transverse frames 22, 24 and the side frames 28, 30 form a second bay 40 that contains the second element 16. The energy absorbing elements 16 are attached to and cantilevered from respective transverse frames 22, 24.

Figure 5:
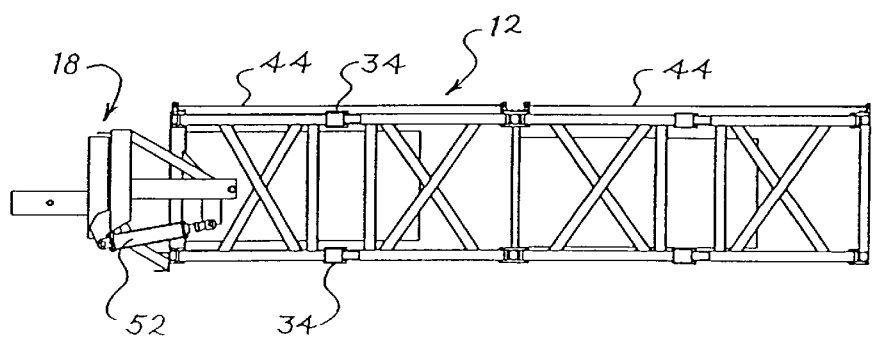
Figure 10:
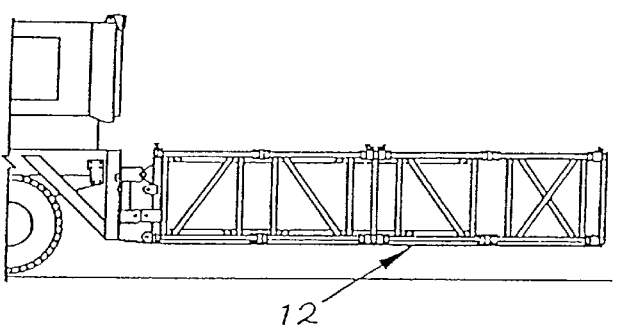
FIGS. 10 and 11 are side views of the embodiment of FIG. 7, showing the crash cushion in an operational, horizontal position (FIG. 10) and a vertical, transport/storage position (FIG. 11).
Figure 11:
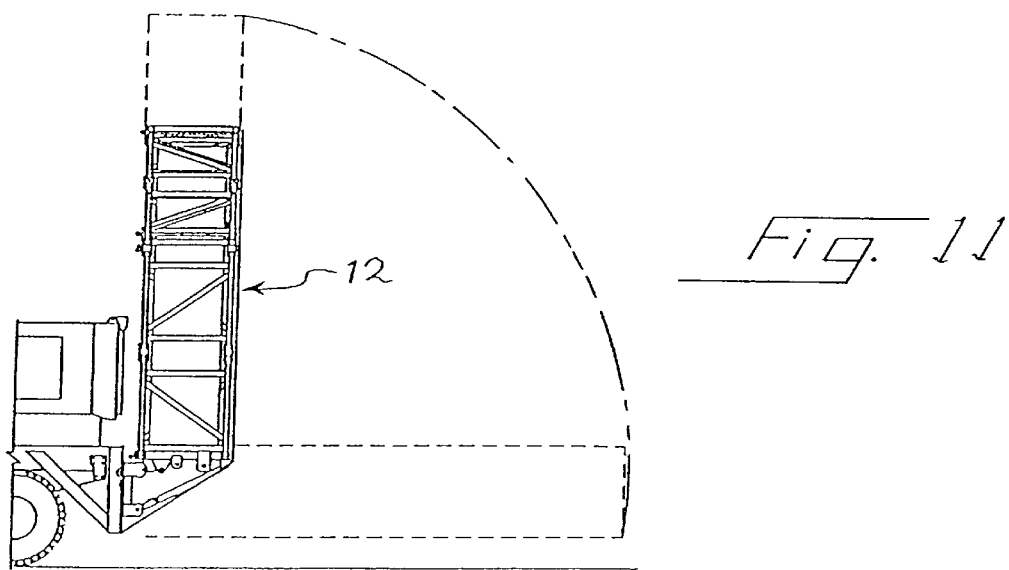

As shown in FIG. 5, one or more hydraulic cylinders 52 can be provided in the mounting structure 18 to pivot the frame 12 between the horizontal, operational position shown in FIGS. 5 and 10, and the vertical, storage/transport position shown in FIG. 11. Cross braces 44 are mounted between the transverse frames as shown in FIGS. 4 and 5 to provide stability prior to impact. These cross braces 44 have been left out of the remaining figures for clarity of illustration.

Figure 6:
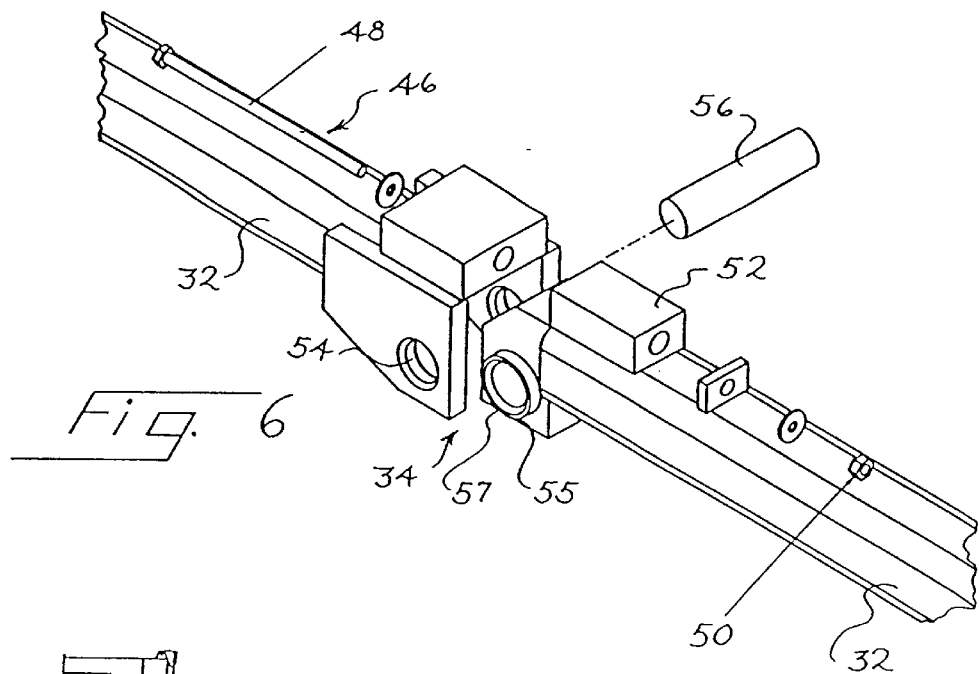
FIG. 6 is a detailed view of a hinge and restraint included in the embodiment of FIG. 2.

FIG. 6 provides an exploded perspective view of one of the hinges 34 and the associated side frame elements 32. The hinge 34 is shown in a rotated position for clarity of illustration. Normally the hinges 34 are oriented with vertical hinge axes, as shown in FIGS. 2 and 4.

As shown in FIG. 6, a restraint 46 is associated with each of the hinges 34. In this embodiment, the restraint 46 takes the form of a bolt 48 and a nut 50. The bolt 48 is passed through openings in mounting blocks 52, and the mounting blocks are rigidly secured in place on respective ones of the side frame elements 32. The hinge 34 in this embodiment is formed by a pin 56 that is received within openings 54, 55. The opening 55 may be formed by a sleeve 57 received in one of the hinge parts.

When the crash cushion 10 is in the operational position shown in FIGS. 1 through 5, each of the eight hinges 34 is held in the closed position by the respective restraint 46. Note that the hinges 34 are positioned in such a way that compressive forces applied to the frame 12 by an impacting vehicle (not shown) striking the transverse frame 20 along the impact direction I (FIG. 4) apply tensile forces to the respective restraints 46. When these tensile forces exceed the strength of the respective bolts 48 (FIG. 6), the bolts are broken, thereby freeing the hinges 34 to open outwardly, and allowing the transverse frames 20, 22, 24 to approach one another and to compress the energy absorbing elements 16.

Figure 7:
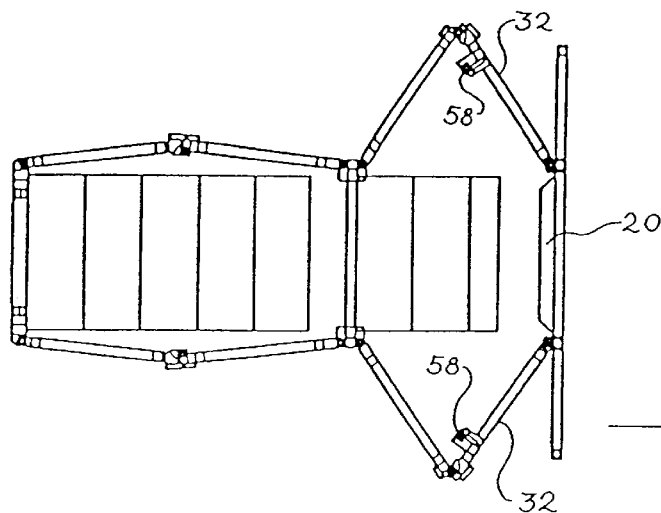
FIG. 7 is a top view of a second preferred embodiment of this invention, showing the frame at an initial stage of collapse during an impact.

FIGS. 7 through 11 relate to a second preferred crash cushion, which is in many ways similar to the first crash cushion described above. Comparable elements are given comparable reference numbers. The crash cushion of FIGS. 7 through 11 differs from the crash cushion 10 described above in that the side frame elements 32 secured to the first transverse frame 20 are additionally provided with auxiliary hinges 58. As shown in FIG. 7, during a normal impact the hinges 58 remain closed and the embodiment of FIGS. 7 through 11 operates quite similarly to the embodiment described above in conjunction with FIGS. 1 through 6.

Figure 8:
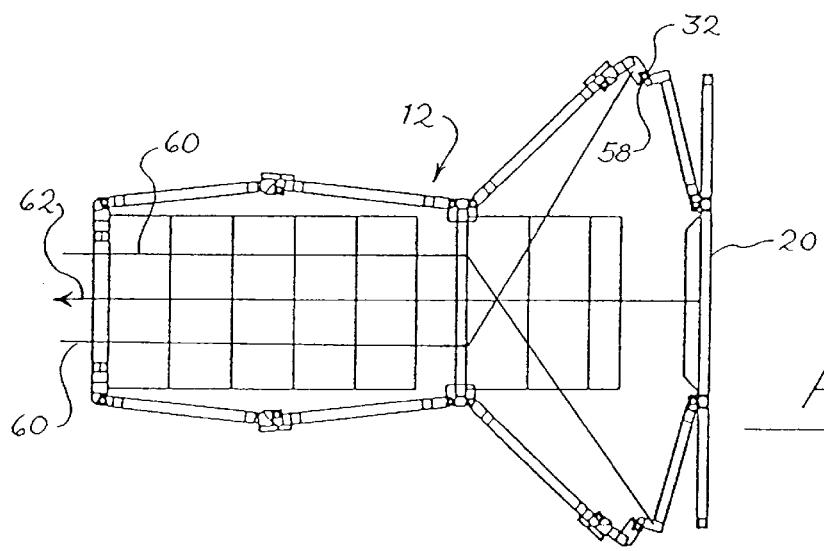
FIGS. 8 and 9 are top views of the embodiment of FIG. 7, showing the crash cushion in a partially collapsed position (FIG. 8) and an extended position (FIG. 9).
Figure 9:
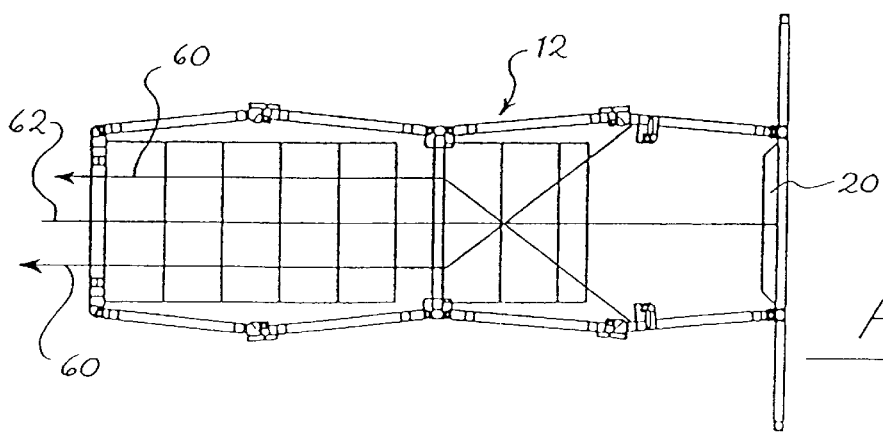

As shown in FIGS. 8 and 9, this embodiment also includes cables 60 and 62. The cables 60 are connected to respective ones of the forward side frame elements 32 adjacent to the auxiliary hinges 58. When the cables 60 are tightened and the cable 62 is loosened, forces are applied to the forward side frame elements 32 to close the auxiliary hinges 58 and to extend the first transverse frame 20 away from the second transverse frame to the operational position shown in FIG. 9. Conversely, when the cables 60 are loosened and the cable 62 is tightened, the first transverse frame 20 is pulled toward the second transverse frame 22 as the auxiliary hinges are opened, as shown in FIG. 8. In this way the overall length of the crash cushion is reduced. The hinges 58 may be spring biased toward the opening direction to facilitate this movement.

Preferably, the cables 60, 62 are attached to a mounting structure similar to that discussed above in such a way that the cables 60, 62 are loosened and tightened as described above automatically as the crash cushion is rotated between the horizontal, operational position of FIG. 10 and the vertical, travel/storage position of FIG. 11. Thus, when the crash cushion is raised to the vertical position of FIG. 11, the cables 60 are automatically loosened and the cable 62 is automatically tightened to shorten the travel height of the crash cushion automatically. Conversely, as the crash cushion is lowered to the operational position shown in FIG. 10, the cables 60 are automatically tightened and the cable 62 is automatically loosened to extend the first transverse frame 20 to the operational position shown in FIG. 9. In this way, the overall height of the crash cushion 10 in the travel position can be maintained at the desired level, such as no more than about 13 feet above the roadway.

The cables 60, 62 and the auxiliary hinges 58 function as a means for automatically collapsing the first bay as the crash cushion is rotated from the horizontal to the vertical position, and as a means for automatically extending the first bay as the crash cushion is rotated from the vertical to the horizontal position. These elements also function as a means for at least partially collapsing the frame 12 to shorten its length for storage.

The means for automatically extending and retracting the frame 12 can take many other forms. For example, the means for extending the frame may include a spring-biased system that causes the first bay of the frame 12 to remain fully extended when the retraction cables are loosened. If desired, one or more latches can be provided so that in the travel position and/or the operational position the configuration of the crash cushion 10 is maintained by some means other than tension on the cables.

Figure 13:
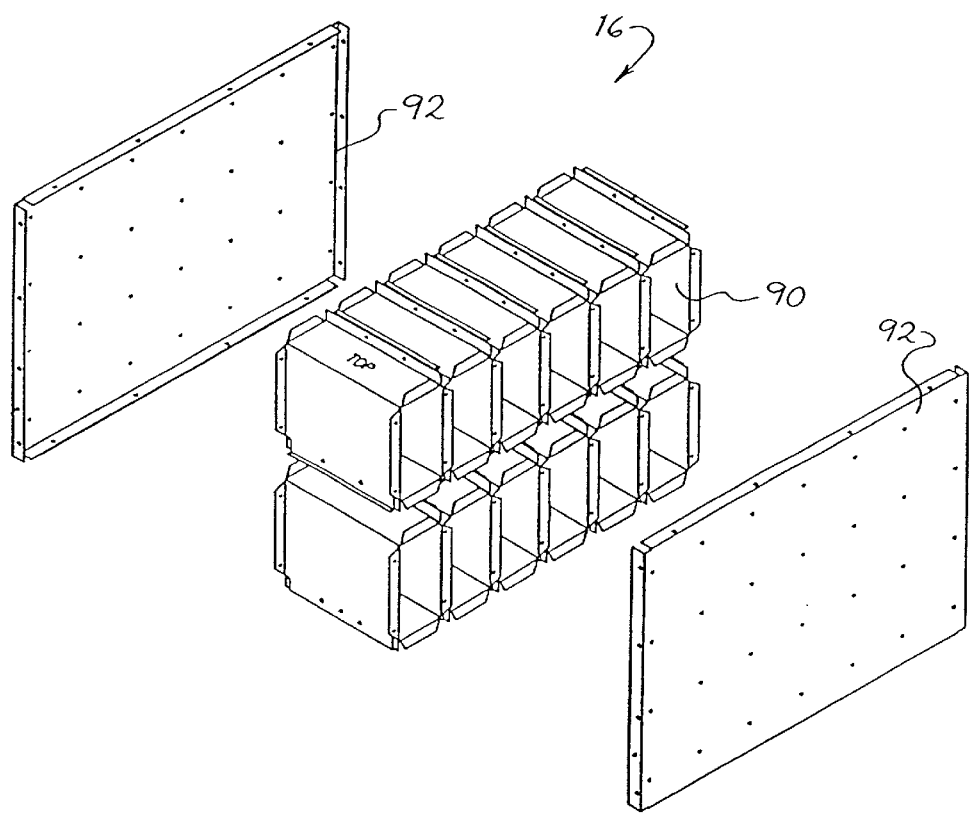
FIG. 13 is an exploded perspective view of a portion of one energy absorbing element suitable for use with this invention.

FIG. 13 shows a preferred structure for one of the energy absorbing elements 16. As shown in FIG. 13, a plurality of sheet metal rectangular cells 90 are disposed between cover plates 92. In an impact, these sheet metal elements are crushed to provide a controlled decelerating force. The cells 90 and the cover plates 92 of FIG. 13 are similar to corresponding elements of U.S. Pat. Nos. 4,711,481 and 5,199,755, assigned to the assignee of the present invention and hereby incorporated by reference in their entirety.

Another preferred structure for the energy absorbing element of FIG. 1 includes a plurality of tapered deformable elements. Tapered deformable elements can take many forms, and several examples are shown in FIGS. 14–21. In general, the tapered deformable elements can be formed as separate, stand-alone tapered elements that are stabilized by fastening both ends of the tapered elements to a frame of some type, such as for example by use of rivets, welds, adhesives or other fasteners. Alternately, the tapered deformable elements can be formed in one or two dimensional arrays.

Figure 14:
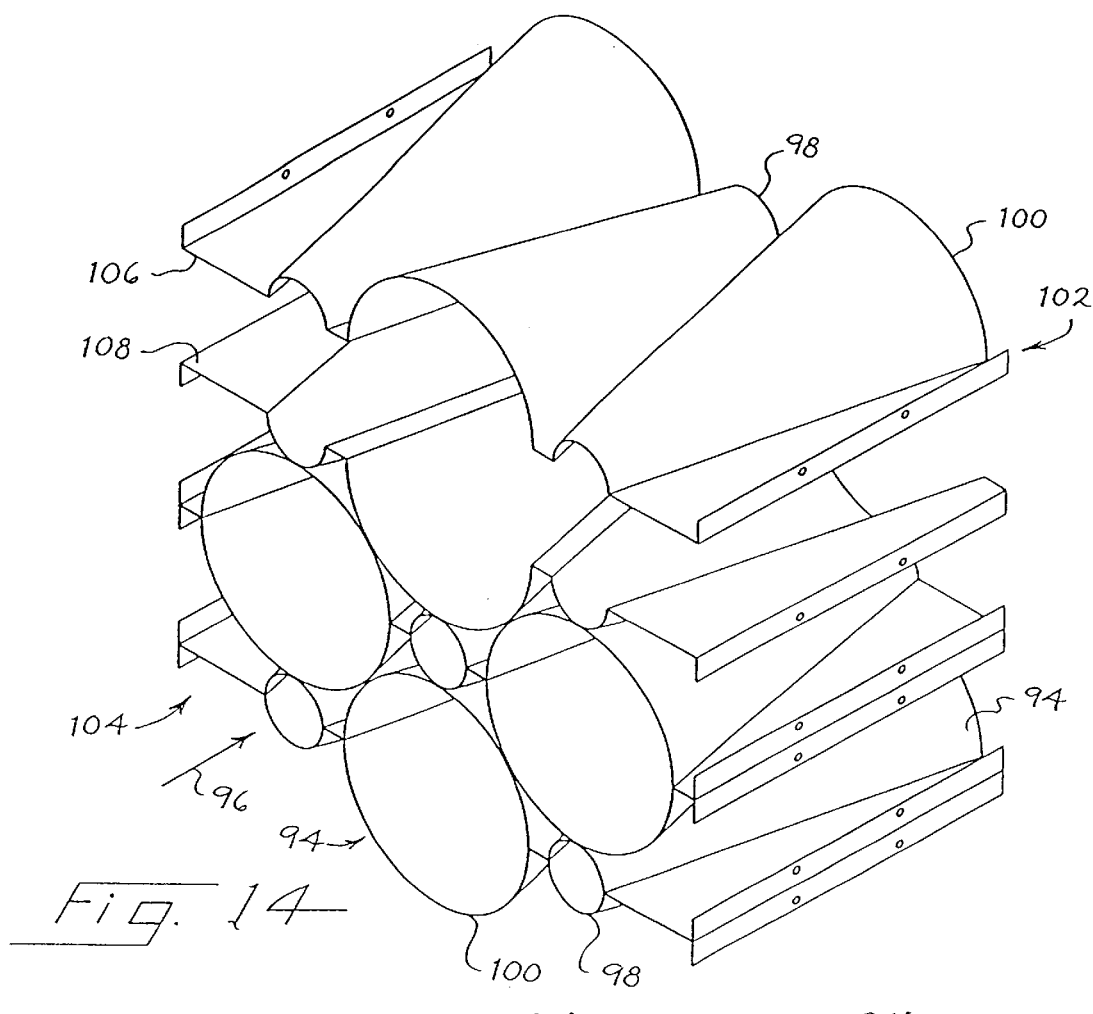
FIGS. 14 and 15 are a perspective, partially exploded view and a front view, respectively, of deformable sheet metal elements suitable for use in another energy absorbing element of this invention.
Figure 15:
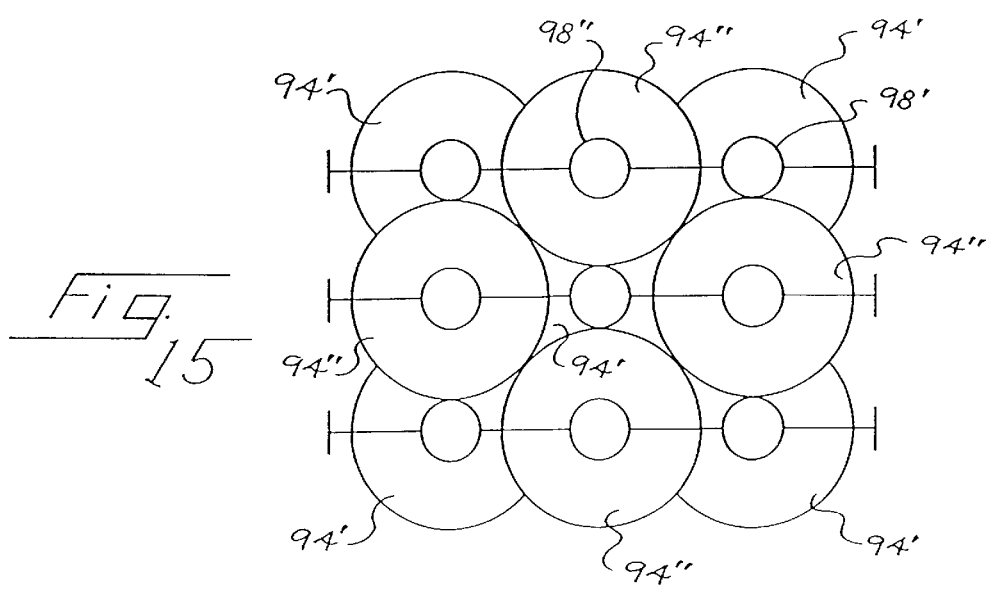

FIGS. 14 and 15 relate to a first type of tapered deformable element 94 in which the elements are generally conical in shape and each includes a small end 98 and a large end 100 spaced along a longitudinal axis 96. As shown in FIG. 14, in this embodiment the tapered deformable elements 94 are closely stacked with some of the small ends 100 oriented toward a first side 102 of the array, and others of the small ends 98 facing the second, opposed side 104 of the array.

In the end view of FIG. 15, the deformable elements are identified as 94' and 94". The elements 94' have their small ends 98' facing the view plane, while the elements 94" have their small ends 98" facing away from the view plane.

Returning to FIG. 14, in this embodiment the deformable elements 94 are formed from two stamped sheets 106, 108 of a sheet material such as sheet aluminum. Depending upon the desired stiffness of the deformable elements, any appropriate gauge and alloy of material can be used. As shown in the uppermost row of FIG. 14, each of the sheets 106, 108 is stamped or otherwise formed to create an array of half cones. The sheets 106, 108 may be physically identical if the half cones are positioned properly on the sheets. When the sheets 106, 108 are mated together, the frustoconical shapes of the individual tapered elements 94 are formed, as shown in the lower two rows of FIG. 14. The sheets 106, 108 can be held together in any suitable manner, as by spot welding, riveting, fastening, or adhesively holding them together or to an external frame (not shown).

FIG. 16–18 relate to another preferred embodiment, in which the tapered deformable elements 111 are each formed from a single sheet 110 of a sheet material such as sheet aluminum. In this case the tapered deformable elements 111 are stamped or drawn from the sheet 110 in a conventional stamping or drawing operation. Thus, the single sheet 110 forms all of the associated tapered elements 111, along with the remaining planar portion of the backing sheet.

As shown in FIGS. 16 and 17, a single sheet 110 of the tapered deformable elements 111 can be used to form a unidirectional array. Alternatively, as shown in FIG. 18, two of the sheets 110 can be nested together to form a bi-directional array, in which the smaller ends of the elements 111 of one sheet face a first direction, while the smaller ends of the tapered elements 111 of the second sheet face the reverse direction.

Figures 19, 20:
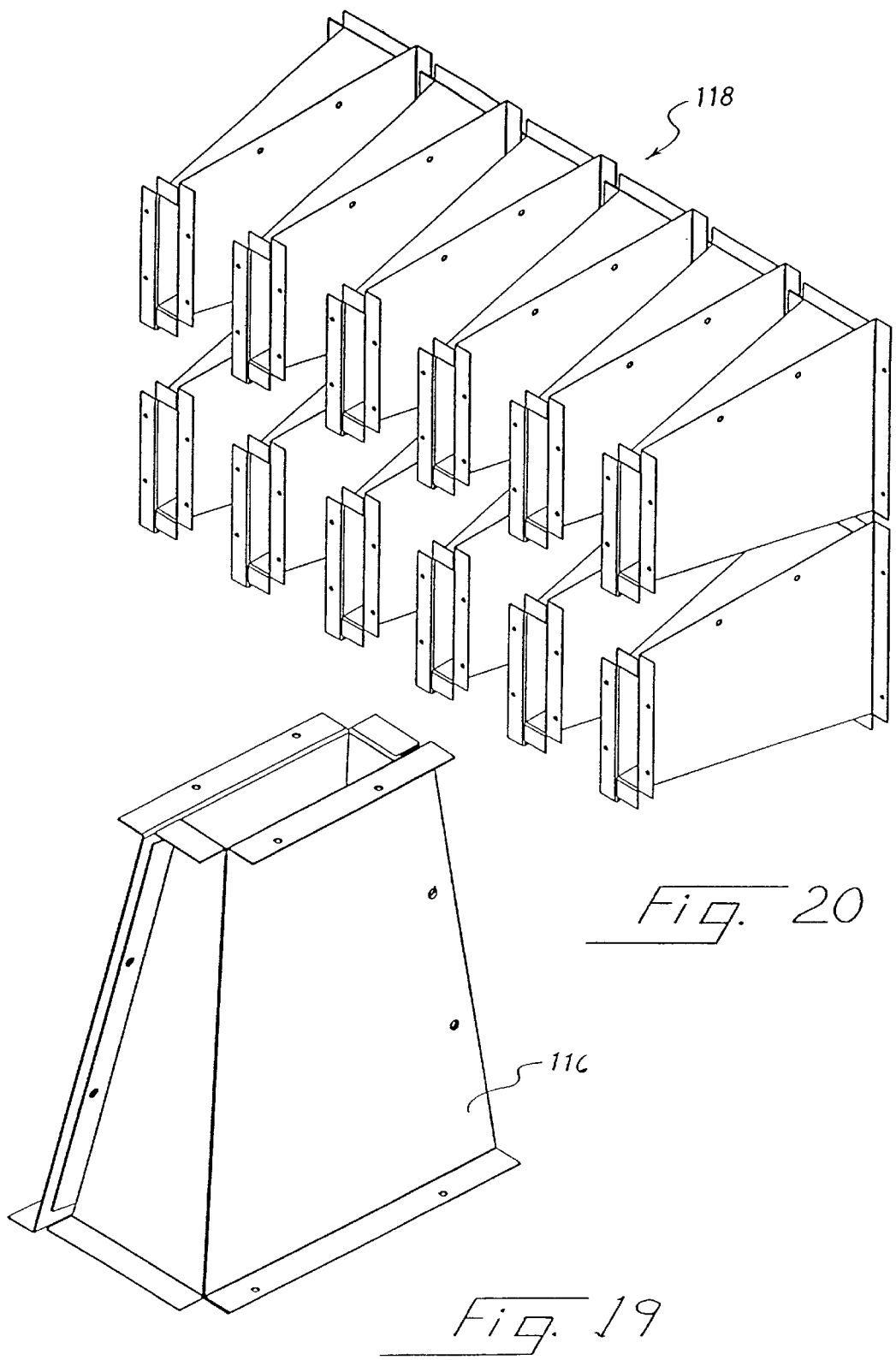
FIG. 19 is a perspective view of a polygonal tapered deformable element.
FIGS. 20 and 21 are perspective views of unidirectional and bi-directional arrays, respectively, using the polygonal deformable element of FIG. 19.
Figure 21:
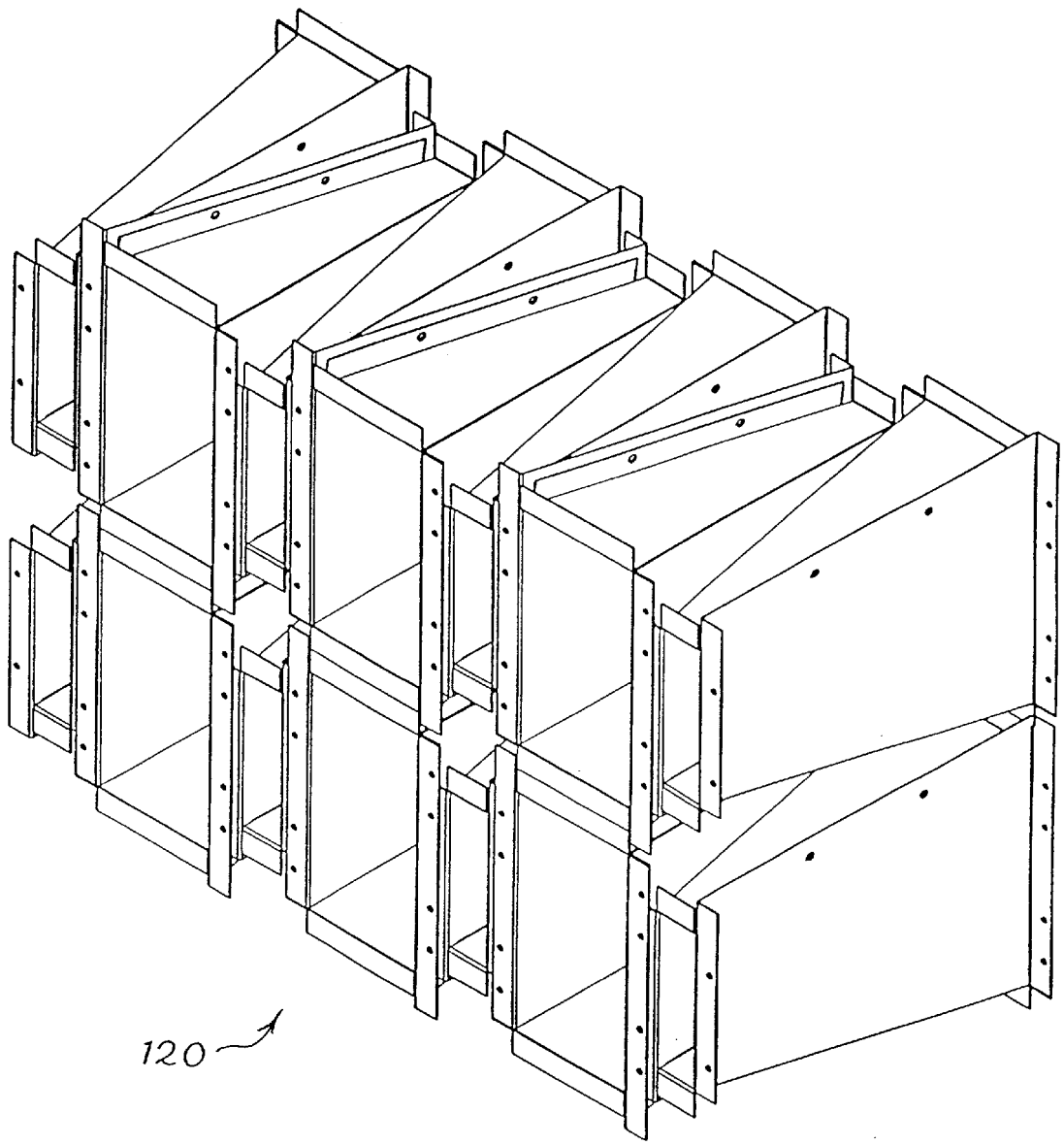

It is not essential in all embodiments that the tapered deformable elements be circular in cross section. As shown in FIGS. 19–21, various polygonal cross sectional shapes can be used. The tapered deformable element 116 of FIG. 19 has a rectangular cross sectional shape. Other polygonal shapes including polygons with more or fewer sides arranged as regular or irregular polygons can be used. As shown in FIGS. 20–21, polygonal tapered deformable elements 116 can be arranged in a uni-directional array 118 or a bi-directional array 120.

Though not shown in FIGS. 14–21, conventional cover plates can be used to house and secure the tapered deformable elements in place, if desired, and multiple rows of the illustrated elements can be used in a single energy absorbing element.

The tapered deformable elements provide the advantage of an increased stroke and thereby increased efficiency. This is because the tapered deformable elements 94, 111, 116 can be crushed to a small fraction of their original length before metal-to-metal contact of the crushed element provides substantial increases in the forces required for further crushing.

The crash cushion 10 reacts to the impact of a vehicle in the following way. First the impacting vehicle contacts the rear impact face 14. This face provides a uniform surface for the vehicle to interact with and transfers the loading from the vehicle to the crash cushion 10. The side frame elements 32 begin to flex because of this loading and then continue to flex until the restraints 46 fail. The amount of loading that is applied to an impacting vehicle can be tuned by taking into account the several factors that determine when the restraints release the respective hinges. These factors may include the geometry of the hinges 34 and the side frame elements 32 in relation to the location of the restraints 46, the ultimate strength of the bolts 48, the stiffness of the side frame elements, and the mass of the side frame elements, the transverse frames and the face 14.

Once the restraints 46 fail, the side frame elements 32 begin to rotate in response to the force supplied by the impacting vehicle to the transverse frame 20. The translation of transverse frame 20 and the rotation of the side frame elements 32 cause a transfer of kinetic energy that was originally in the impacting vehicle into the frame 12, thereby slowing the impacting vehicle. The side frame elements 32 continue to collapse until the gaps G1, G2 between the energy absorbing elements 16 and the transverse frames 20, 22 have closed (FIG. 4). The energy absorbing elements 16 are then deformed as they collapse until the design level of kinetic energy has been dissipated by the system or the vehicle has been brought to a stop.

The crash cushion 10 is designed so that under many impacts most of the components of the frame 12 are reusable. The energy absorbing elements 16 are expendable and are intended to be replaced after an impact.

The initial decelerating forces applied by the crash cushion 10 to an impacting vehicle are determined as a function of (1) the linear inertia of the component elements of the frame 12 (e.g. the mass of the transverse frame 20), (2) the linear and rotational inertia of the side frame elements 32, and (3) the angular offset of each side frame element 32 with respect to the collapsing loads applied during an impact. Note that both the linear and the rotational inertial responses of the system do not involve any planned deflection of, tearing of, or other damage to the frame 12.

The initial impact response of the crash cushion 10 also depends on the use of mechanical or electromechanical restraints that limit release of the collapsible bays until some desired minimum threshold level of impact severity is achieved. The system described above is completely passive, and relies on the breaking of bolts placed in tension by the impact to control the release of the frame 12. Other passive means such as shear pins, breakaway cables, or high-friction brakes in each of the hinges 34 can also be used. Alternatively, restraints suitable for use with this invention may involve sensors and/or controls that adjust the properties of the release to best suit the particular characteristics of the impacting vehicle, after some determination is made about the conditions of the impact. For example, a restraint may include an electromechanical device. When a load (as measured by an integral load cell) reaches a threshold value, a locking pin may be pulled out of a joint by an actuator, thus releasing the hinge. Thus, the restraints that limit collapse of the frame may or may not be reusable and they may be passive or active. The key characteristic is that the collapse of the system is released under specific and predictable conditions, but not otherwise. Active restraints may allow collapse of the frame to be conditional on any desired combination of impact conditions such as force, velocity, and displacement.

By adjusting the inertial properties of the transverse frames 20, 22 and the side frame elements 32, by adjusting the geometry of the side frame elements 32 (i.e. the amount the side frame elements 32 are bent at their hinges 34 in their deployed, operational position), and by adjusting the characteristics of the restraints 46, the response of the crash cushion 10 can be tailored to optimally trigger onboard airbags or other onboard safety systems of an impacting vehicle. One particular challenge for airbags is the distinguishing of conditions requiring deployment of the airbag, for example a high-speed accident, from conditions under which the airbag is not required, for example a low speed bump into a parking bollard or another vehicle. By adjusting the response of the crash cushion, the problem of non-deployment, or inappropriate deployment of airbags can be reduced. For example, by adjusting crash cushion parameters to obtain a relatively high initial deceleration spike, the crash cushion 10 can provide an initial force on the impacting vehicle that is large enough and shaped to tend to ensure the deployment of an airbag early in the impact, thus maximizing the benefit of the airbag to the vehicle occupants.

The crash cushion 10 can also be designed to reduce the overall length of the crash cushion 10. It is generally true that the greater the length of a crash cushion, the lower the forces of impact will be. However, additional length limits the sites at which a particular crash cushion may be properly applied. In the application of a crash cushion mounted to the back of a truck, the length of the crash cushion is of particular sensitivity, in that additional length adds weight that must be supported by the frame of the truck. Further, the weight of the truck-mounted crash cushion is generally cantilever-mounted to the truck, so that additional length increases the moment of the weight of the crash cushion on the mounting structure 18. Also, as the length of a truck-mounted crash cushion increases, the rearmost end of the crash cushion will tend to swing widely as the truck turns. For these reasons, reducing the length of truck-mounted crash cushions is of particular benefit.

As the length of a crash cushion is reduced, it is important that the impact response of the crash cushion is very carefully designed so to continue to provide optimal safety performance. The ability of the designer to tune the response of the crash cushion allows this delicate balance between the system's length and its impact performance to be established.

Another advantage of the frame 12 is that it can be collapsed to a very compact size for shipping and storage. If the included energy absorbing elements 16 are themselves collapsible (e.g. formed of hydraulic or pneumatic elements), then the frame 12 can be collapsed while mounted on the truck T so that the crash cushion 10 can be made very compact when the truck T is in transit.

Figure 12:
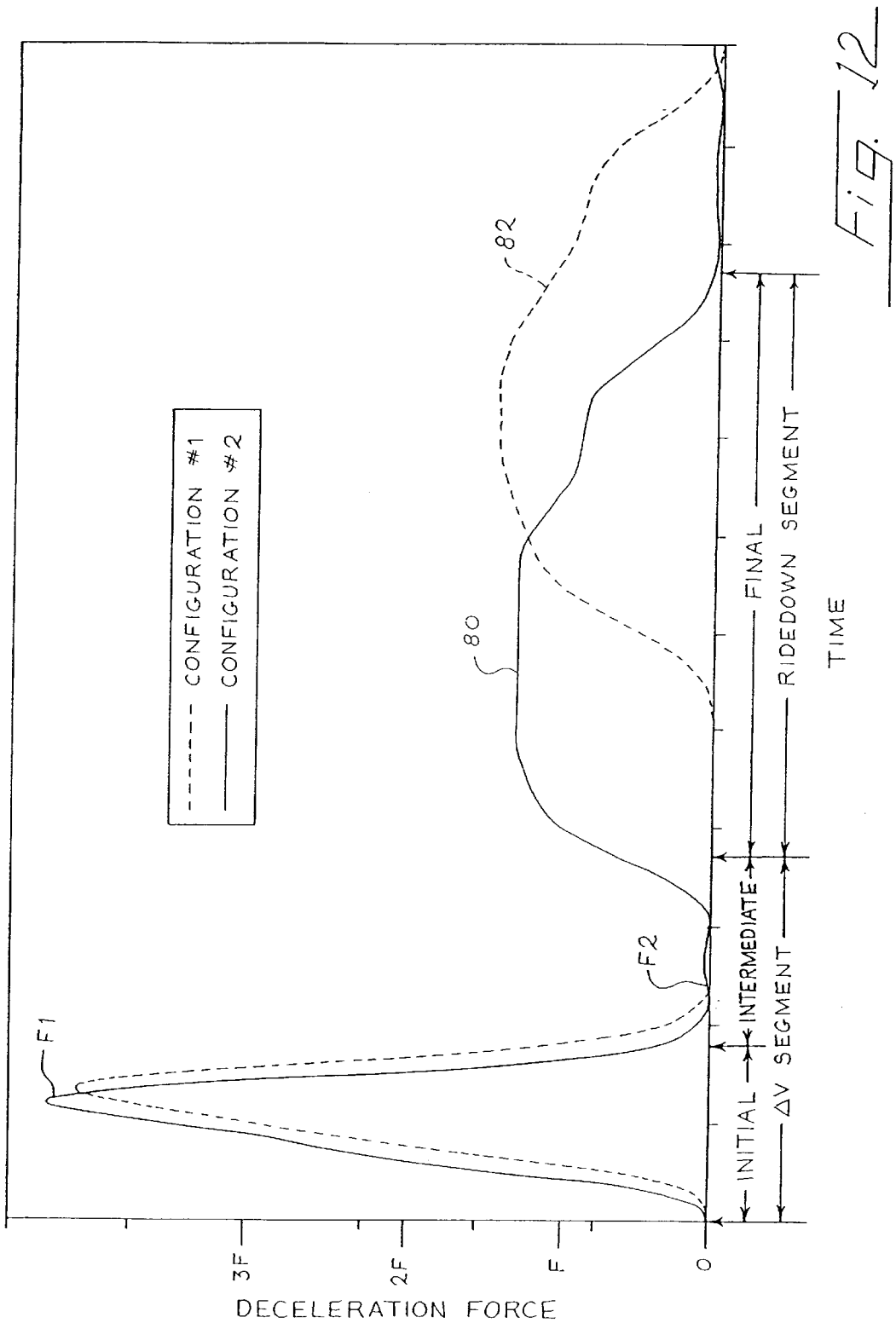
FIG. 12 is a graph of deceleration force versus time for two variants of the embodiment of FIG. 2 during comparable impact events.

Actual crash tests have shown that the crash cushion 10 can readily be tuned by adjusting the parameters described above to obtain a desired deceleration curve. FIG. 12 shows two curves 80, 82 of decelerating force versus time as an impacting vehicle strikes the crash cushion 10. The principal differences between the tests that resulted in the curves 80 and 82 relate to selected ones of the variables described above. For the curve 80, two energy absorbing elements 16 were used, but the energy absorbing element 16 in the first bay was shorter and less stiff than the energy absorbing element in the second bay. In particular, the gap G1 was 33 inches while the gap G2 was seven inches. The conditions used for the curve 82 included no energy absorbing element in the first bay and a gap of only one inch between the energy absorbing element of the second bay and the second transverse frame 22. Note that the curve 80 provides a second peak after the initial spike that occurs substantially earlier during the crash than the second peak in the curve 82. The magnitudes and locations in time of the peaks can be controlled by properly choosing the system parameters discussed above.

From the foregoing it should be apparent that an improved highway crash cushion has been described that lends itself to being tuned by the designer for particular impact characteristics. For the crash cushion 10, there are at least five variables that can be selected for each of the two bays: linear inertia, rotational inertia, stiffness of the energy absorbing element in the bay, gap between the energy absorbing element and the respective transverse frames, and release load of the restraints. Any of these variables can be set at different levels for the two bays. Furthermore, the two bays cooperate with one another in a complex way.

The preferred crash cushion of this invention arranges these variables to achieve a novel system response profile that meets currently-prevailing regulatory standards while providing a dramatically shortened crash cushion.

Impact testing of crash cushions is guided in North America by the National Cooperative Highway Research Program Report 350 (NCHRP-350). The NCHRP-350 guidelines rely on the flail space model for evaluation of occupant risk during an impact test. The flail space model assumes an unrestrained occupant in the front seat of the vehicle. At the beginning of the crash event, the vehicle is decelerated by the impact with the crash cushion, while the occupant continues forward in an unimpeded manner. At some point, the occupant makes contact with the inside of the vehicle, and the NCHRP-350 guidelines specify limits on the velocity of the occupant relative to the vehicle at the moment of contact. Once the occupant has come into contact with the vehicle interior, he or she is assumed to remain in contact with the vehicle as it is decelerated to a stop. The NCHRP-350 guidelines specify that while the occupant is in contact with the vehicle interior, the magnitude of deceleration of the vehicle must not exceed 20 G. These guidelines also specify that the occupant shall not come into contact with the vehicle at a relative speed greater than 12 meters per second.

For the purposes of this discussion, the portion of an impact event or crash up to the instant of occupant impact with the interior of the vehicle will be referred to as the delta-V segment or portion, and the remainder of the event (from occupant impact until the vehicle comes to rest) will be referred to as the ride-down segment.

The delta-V segment and the ride-down segment for one impact are shown in FIG. 12. The delta-V segment is divided into an initial portion and an intermediate portion, and the ride-down segment corresponds to the final portion of the impact event. These legends are relevant only to the curve 80. The curve 82 has been tuned for other characteristics and is not relevant in this discussion.

As shown in FIG. 12, the initial portion of the system response profile is characterized by a high peak deceleration, that is associated with a peak decelerating force exceeding 3 F in this embodiment. The initial portion is followed by an intermediate portion in which vehicle deceleration falls. The intermediate portion is characterized by a substantial reduction in decelerating forces on the vehicle. In this case, the decelerating forces approximately reach zero.

Once the vehicle has been decelerated by the desired velocity (such as 12 meters per second), the crash cushion then provides a controlled deceleration below the regulatory limit of 20 G during the final portion. In the final portion the average decelerating force is at the level F shown in FIG. 12.

The curve 80 is provided by way of example. In general, it is preferred to apply high decelerating forces to the impacting vehicle that peak at F1 during the initial portion of the impact event. F1 is preferably at least about 150% of F, more preferably at least about 200% of F, and most preferably at least about 300% of F. This provides a sharp deceleration to the vehicle which contributes to a short stopping distance for the impact event. However, if the high peak deceleration of the initial portion of the impacting event were continued, the vehicle would be decelerated to such an extent that the occupant would strike the interior of the vehicle with an excessively high velocity. In order to prevent this undesired result, the intermediate portion of the impact event or the response profile falls to a decelerating force that is substantially less than F. Preferably, the decelerating force falls to a value F2 that is less than 50% of F, more preferably less than 20% of F, and most preferably less than 10% of F. The decelerating force preferably remains below this value for at least 20 mS, more preferably at least 30 mS, and most preferably at least 40 mS. The foregoing values are provided for force levels and time durations as independent parameters, and are not intended to indicate a preference for any specific combination of force level and time duration.

The inventors of the present invention have discovered that by taking the counterintuitive step of substantially reducing decelerating forces on the vehicle during the intermediate portion of the impact event, following the sharp peak in decelerating forces during the initial portion, the total elapsed time and the total elapsed distance of the impact event can be reduced. Because a short impact event is important for many applications, this represents a significant advance in the art.

Simply by way of example, significant system parameters associated with the system that produced the deceleration curve 80 of FIG. 12 are described in Table I.

TABLE I

Preferred Crash Cushion Parameters

A. Mass of Frame Elements
   transverse frame 20     129 kg
   transverse frame 22     58 kg
   side frame element 32     32 kg
B. Moment of Inertia
   side frame element 32     1.92 kg-m²
C. Bolts 48
   Hex bolt, ⅜", coarse thread, grade 8
D. Gaps
   G1 = .229 m
   G2 = .178 m
E. Front Energy Absorbing Element 16

TABLE I-continued

Preferred Crash Cushion Parameters

| | Number of cells per row | Material thickness (mm) |
|---|---|---|
| Row 1 (Front) | 4 | .81 |
| Row 2 | 4 | .81 |
| Row 3 | 8 | .81/1.02 (4 cells of each) |
| Row 4 | 8 | .81/1.02 (4 cells of each) |
| Row 5 (Rear) | 8 | 1.02 |
| F. Rear Energy Absorbing Element 16 | | |
| | Number of cells per row | Material thickness (mm) |
| Row 1 (Front) | 8 | .81 |
| Row 2 | 12 | 1.27 |
| Row 3 | 12 | 1.27 |
| Row 4 | 12 | 1.27 |
| Row 5 (Rear) | 12 | .81/1.02 (6 cells of each) |

In the crash cushion of Table I, the energy absorbing elements 16 each include five rows of sheet aluminum cells. FIG. 13 shows a twelve cell row, and the other rows were similar, but with fewer cells per row where appropriate.

The crash cushions described above represent only one approach to achieving the desired system response profile. Many other approaches are possible. For example, a large inertial mass can be placed at a selected distance in front of a conventional crash cushion, such as the truck-mounted attenuator described in U.S. Pat. No. 5,199,755. Alternately, a brake-based crash cushion such as that described in U.S. Pat. No. 5,022,782 can be provided with an intermediate portion of the stroke in which the braking efficiency, and thereby the decelerating force, are substantially reduced. This can be done by properly adjusting the dimension, material or lubrication of the brake cable. As yet another example, the high peak deceleration during the initial portion of the impact event can be provided by a pneumatic or hydraulic energy absorbing system that is followed after a specified gap by a second, less stiff energy absorbing system.

In a further example of such a system provided with a pneumatic or hydraulic energy absorbing system, the energy absorbing means can be valved to provide an initial force peak, followed by a dramatic reduction in resistive force, then finally followed by a second, lower resistive force. More specifically, the initial peak force can be provided by a pre-pressurized pneumatic element, for example a gas-containing bag, with the pneumatic element allowed to rapidly vent immediately after that initial peak force so that the resistive force of the crash cushion falls dramatically during the intermediate segment of the crash event, after which the gas-containing bag can be explosively re-pressurized to provide the necessary resistive force during the final segment of the crash event. Another approach is to use a stiff crushable element to provide the ideal response profile. A mechanical release, as disclosed by June U.S. Pat. No. 5,642,794 would then release after a specified amount of crush had taken place.

Another approach to generating the desired system response profile is to support the impact face of the crash cushion with a sacrificial mechanical support that provides the needed initial peak force but is then completely crushed or shattered so that its resistance drops to near zero for the intermediate segment of the crash event, after which the impacting vehicle engages a more conventional crash element for the final segment of the crash event. The crushable element can be replaced by elements that are extruded, split, curled, kinked, or otherwise mechanically deformed.

A suitable crash cushion can also be made with bays that collapse via sliding elements instead of or in addition to some of the hinged elements of the crash cushion 10.

In general, the widest variety of energy absorbing systems can be used to provide the desired system response profile, and different energy absorbing technologies can be used to achieve different portions of the system response profile. The widest possible range of material bending, material tearing, material crushing, material shattering, friction, hydraulic, pneumatic, and inertial systems can be used either alone or in various combinations to achieve the response profile discussed above.

Of course, many changes and modifications can be made to the preferred embodiments described above. For example, the frame can be made in whole or in part of solid panels as opposed to the illustrated construction. Similarly, the transverse frames can include solid panels and may differ from one another in thickness and in mass. If desired, the folding sides of the frame may be positioned at the top and the bottom of the crash cushion instead of on the lateral sides. Living hinges can be substituted for the multiple-component hinges illustrated, and as described above many alternatives are available for the restraints. Any suitable energy absorbing element technology can be adapted for use with this invention, including hydraulic, pneumatic, material-deforming, tearing, or pulverizing and other approaches. Both passive and active systems may be employed. By "active" is meant systems in which sensors provide information to the crash cushion which is in some manner evaluated and used to alter the performance of the crash cushion prior to and/or during the impact. Furthermore, it is not essential that each energy absorbing element be confined to a single bay. If desired, the transverse frames can define central openings that allow a single energy absorbing element to occupy space in two or more bays. This invention is not limited to use in truck mounted attenuators, but can also be used in front of other roadside obstructions, including fixed roadside obstructions such as bridge piers for example. Also, more than two bays may be used if desired.

As used herein the term "conical" is intended broadly to include frusto-conical shapes and the term "storage" is intended broadly to include transport as well as storage. The term "cable" is intended broadly to cover tension members generally, including chains, wire ropes, ropes, and the like.

The foregoing detailed description has described only a few of the many forms that this invention can take. For this reason, this detailed description is intended by way of illustration and not by way of limitation. It is only the following claims, including all equivalents, that are intended to define the scope of this invention.

What is claimed is:

1. A highway crash cushion comprising:
   a frame forming at least first and second bays arranged one behind another in an anticipated impact direction, said frame comprising:
      at least first, second and third transverse frames spaced from one another along the anticipated impact direction such that the first bay is between the first and second transverse frames and the second bay is between the second and third transverse frames;
      at least first, second, third and fourth side frames, said first and second side frames extending between the first and second transverse frames on respective sides of the first bay, and said third and fourth side frames extending between the second and third transverse frames on respective sides of the second bay, each of said side frames comprising:
         first and second side frame elements coupled to the respective transverse frames, and a hinge coupled between the first and second side frame elements;
   at least one energy absorbing element disposed in at least one of the bays; and
   at least first and second restraints coupled to the side frames to resist movement of the hinges.

2. The invention of claim 1 wherein the first and second side frame elements are coupled to the respective transverse frames by additional hinges.

3. The invention of claim 1 wherein the restraints comprise bolts.

4. The invention of claim 1 wherein the hinges are arranged such that the side frame elements hinge outwardly from the respective bays.

5. The invention of claim 1 wherein the energy absorbing element comprises a plurality of tapered deformable elements.

6. The invention of claim 5 wherein the deformable elements comprise conically-shaped sheet material.

7. The invention of claim 1 wherein the restraints are associated with respective bays, wherein the first and second restraints release the side frames of the respective bay at respective first and second levels of compressive force, and wherein the first and second levels differ.

8. The invention of claim 1 further comprising a second energy absorbing element disposed in the second bay, wherein the first and second energy absorbing elements differ in stiffness in the anticipated impact direction.

9. The invention of claim 1 further comprising:
   means for at least partially collapsing one of the bays to cause the first and third transverse frames to approach one another for storage.

10. The invention of claim 1 wherein the frame is mounted to a vehicle.

11. The invention of claim 1 wherein the frame is mounted to a vehicle as a self supporting structure.

12. The invention of claim 1 wherein said at least one energy absorbing element is disposed in the second bay and no energy absorbing element is disposed in the first bay.

13. A highway crash cushion comprising:
   a frame forming at least first and second bays arranged one behind another in an anticipated impact direction, said frame comprising:
      at least first, second and third transverse frames spaced from one another along the anticipated impact direction such that the first bay is between the first and second transverse frames and the second bay is between the second and third transverse frames;
      at least first, second, third and fourth side frames, said first and second side frames extending between the first and second transverse frames on respective sides of the first bay, and said third and fourth side frames extending between the second and third transverse frames on respective sides of the second bay, each of said side frames comprising:
         first and second side frame elements coupled to the respective transverse frames, and a hinge coupled between the first and second side frame elements;
   at least one energy absorbing element disposed in at least one of the bays;
   at least first and second restraints coupled to the side frames to resist movement of the hinges; and
   a second energy absorbing element disposed in the second bay, wherein the first and second energy absorbing elements are shorter than the respective bays by respective first and second distances in the anticipated impact direction, and wherein the first and second distances differ from one another.

14. A highway crash cushion comprising:

a frame forming at least first and second bays arranged one behind another in an anticipated impact direction, said frame comprising:
   at least first, second and third transverse frames spaced from one another along the anticipated impact direction such that the first bay is between the first and second transverse frames and the second bay is between the second and third transverse frames;
   at least first, second, third and fourth side frames, said first and second side frames extending between the first and second transverse frames on respective sides of the first bay, and said third and fourth side frames extending between the second and third transverse frames on respective sides of the second bay, each of said side frames comprising:
      first and second side frame elements coupled to the respective transverse frames, and a hinge coupled between the first and second side frame elements;
at least one energy absorbing element disposed in at least one of the bays;
at least first and second restraints coupled to the side frames to resist movement of the hinges;
a plurality of auxiliary hinges in the first side frame elements of the first and second side frames;
a first cable coupled to at least one of the first and second side frames to pull the first and second side frames to an operational position and to cause the auxiliary hinges to close; and
a second cable coupled to the first transverse frame to pull the first transverse frame toward the third transverse frame and to cause the auxiliary hinges to open.

15. A highway crash cushion comprising:

a frame forming at least first and second bays arranged one behind another in an anticipated impact direction, said frame comprising:
   at least first, second and third transverse frames spaced from one another along the anticipated impact direction such that the first bay is between the first and second transverse frames and the second bay is between the second and third transverse frames;
   at least first, second, third and fourth side frames, said first and second side frames extending between the first and second transverse frames on respective sides of the first bay, and said third and fourth side frames extending between the second and third transverse frames on respective sides of the second bay, each of said side frames comprising:
      first and second side frame elements coupled to the respective transverse frames, and a hinge coupled between the first and second side frame elements;
at least one energy absorbing element disposed in at least one of the bays;
at least first and second restraints coupled to the side frames to resist movement of the hinges;
means for automatically collapsing the first bay at least partially as the crash cushion is rotated from a horizontal to a vertical position; and
means for automatically extending the first bay to an operational position as the crash cushion is rotated from a vertical to a horizontal position.

16. An energy absorbing element for a highway crash cushion, said energy absorbing element comprising:
   a plurality of tapered deformable elements, each deformable element comprising a respective smaller end, a respective larger end, and a respective wall extending therebetween, each deformable element defining a respective longitudinal axis extending between the respective smaller and larger ends, said longitudinal axes generally aligned with the smaller ends of first ones of the deformable elements facing a first side of the energy absorbing element and the smaller ends of second ones of the deformable elements facing a second side of the energy absorbing element, opposite the first side, the walls of at least one pair of adjacent first and second ones of the deformable elements being physically separate from one another and extending alongside one another.

17. The invention of claim 16 wherein the deformable elements comprise conically-shaped sheet material.

18. The invention of claim 17 wherein the sheet material comprises sheet metal.

19. The invention of claim 16 wherein the first ones of the deformable elements having smaller ends facing the first side of the energy absorbing element are formed from and interconnected by an integral metal sheet.

20. The invention of claim 16 wherein a first plurality of the deformable elements comprise two metal sheets, each metal sheet forming a respective half of and extending between the first plurality of deformable elements.

21. The invention of claim 20 wherein the first plurality of deformable elements comprise both deformable elements with smaller ends facing the first side of the energy absorbing element and deformable elements with smaller ends facing the second side of the energy absorbing element.

22. The invention of claim 16 wherein the deformable elements are substantially polygonal in cross section.

23. The invention of claim 16 wherein the deformable elements are substantially circular in cross section.

24. A method for decelerating a vehicle that has left a roadway, said method comprising the following steps:
   (a) applying decelerating force that peaks above a value F1 to a vehicle with a crash cushion during an initial portion of an impact event between the vehicle and the crash cushion;
   (b) applying a decelerating force that falls below a value F2 to the vehicle with the crash cushion during an intermediate portion of the impact event, after the initial portion; and
   (c) applying a decelerating force at an average value F to the vehicle with the crash cushion during a final portion of the impact event, after the intermediate portion;
      wherein F1 is substantially greater than F and F2 is substantially less than F.

25. The method of claim 24 wherein F2 is less than one-half of F.

26. The method of claim 24 wherein F2 is less than one-fifth of F.

27. The method of claim 24 wherein F2 is less than one-tenth of F.

28. The method of claim 24 wherein F1 is more than 1.5 times F.

29. The method of claim 24 wherein F1 is more than two times F.

30. The method of claim 24 wherein F1 is more than three times F.

31. The method of claim 24 wherein the decelerating force during the intermediate portion remains below one-half of F for at least 20 mSec.

32. The method of claim 24 wherein the decelerating force during the intermediate portion remains below one-half of F for at least 30 mSec.

33. The method of claim 24 wherein the decelerating force during the intermediate portion remains below one-half of F for at least 40 mSec.

34. A highway crash cushion that generates a system response profile when impacted by a vehicle of a selected class at a selected speed, said system response profile characterized by an initial portion, an intermediate portion, and a final portion; said crash cushion comprising:

means for applying an average decelerating force F to the impacting vehicle during the final portion;

means for applying a decelerating force to the impacting vehicle during the initial portion that peaks at a value substantially greater than F; and means for applying a decelerating force to the impacting vehicle during the intermediate portion that falls to a value substantially less than F.

35. The invention of claim 34 wherein the decelerating force to the impacting vehicle falls during the intermediate portion to a value less than one-half of F.

36. The invention of claim 34 wherein the decelerating force to the impacting vehicle falls during the intermediate portion to a value less than one-fifth of F.

37. The invention of claim 34 wherein the decelerating force to the impacting vehicle falls during the intermediate portion to a value less than one-tenth of F.

38. The invention of claim 34 wherein the decelerating force to the impacting vehicle peaks during the initial portion at a value more than 1.5 times F.

39. The invention of claim 34 wherein the decelerating force to the impacting vehicle peaks during the initial portion at a value more than two times F.

40. The invention of claim 34 wherein the decelerating force to the impacting vehicle peaks during the initial portion at a value more than three times F.

41. The invention of claim 34 wherein the decelerating force during the intermediate portion remains below one-half of F for at least 20 mSec.

42. The invention of claim 34 wherein the decelerating force during the intermediate portion remains below one-half of F for at least 30 mSec.

43. The invention of claim 34 wherein the decelerating force during the intermediate portion remains below one-half of F for at least 40 mSec.

* * * * *